455/3 179-8 77

Feb. 19, 1963 F. H. McINTOSH 3,078,348

LECTURE BROADCASTING SYSTEM

Filed Jan. 27, 1959 2 Sheets-Sheet 1

INVENTOR
FRANK H. McINTOSH
BY Hurvitz & Rose
ATTORNEYS

INVENTOR
BY FRANK H. McINTOSH
[signature]
ATTORNEYS 3,078,348

LECTURE BROADCASTING SYSTEM

Frank H. McIntosh, 1906 M St. NW., Washington, D.C.

Filed Jan. 27, 1959, Ser. No. 789,393
7 Claims. (Cl. 179—82)

The present invention relates generally to systems of short range broadcasting of multiple programs in a restricted area, and to receivers for the broadcast signals.

Briefly describing the invention, a plurality of tape reproducers is employed to provide multiple programs, and all the tapes may have different recorded content. Each reproducer is coupled to a different modulator, the modulators all supplied by the same carrier frequency, deriving from the same source. Thereby, the phases of the transmitted carriers are phase locked at zero frequency difference. Each transmitter broadcasts by means of a tuned loop, in a different area. The carrier frequency employed may be in the range 100 kc. and at such power that the signal is broadcast over a short range only.

In one preferred mode of producing the invention, it is desired to broadcast different programs into separate rooms of the same building. In such case the antennae employed may be constituted of loops extending about the boundaries of the room at floor level. Signal may then be received anywhere within the room, at relatively high level, but the level of any signal in an adjacent room is quite low, and does not present an interference program.

On the other hand, for some applications the loops may subsist in vertical planes, and be located all in a single room, auditorium or the like.

The loop antennae may be tuned, preferably by means of a variable series capacitor. By reason of the frequency employed, and the tuning of the loops, broadcasting over the desired range may be accomplished with relatively small power and by means of relatively inexpensive equipment. Moreover, slight detuning of the antenna affords a device for controlling emitted power simply and effectively.

The receivers of the system are arranged to be self-powered, either by a single small dry cell, or in response to received signal. So, for example, a diode or transistor detector may be employed, which derives carrier signal from an antenna comprising a short ferrite rod employed as a core for the coil of a tuned circuit. Other forms of antennae, as simple loops, may also be employed. The detector supplies its output to a single earpiece, of the type common in hearing aids, which may be conveniently hung from an ear. The receiver, exclusive of ear-piece may be carried as convenient, about clothing, or the like.

As a further modification of the receiver of the system, resort may be had to a hollow wand-like structure, within which is contained the receiver antenna and receiver of the system. The longitudinal axis of the receiver antenna coincides with the longitudinal axis of the wand-like structure, so that the receiver is receptive only of a transmitting loop toward which it is pointed. A small acoustic transducer may be secured to one end of the wand-like structure, so that the transducer may be held to the ear while the structure is being pointed.

In accordance with still another embodiment of the invention the acoustic transducer, sometimes called ear piece, may be mounted in a disposable support, for hygienic reasons. The support is so constructed as to isolate the ear from the surrounding space, so that ambient noise at the ear is reduced, and so that the ear piece need not contact the ear to provide a suitable level of acoustic output.

The receiver circuitry may take a variety of forms, but certain basic problems must be met. One problem is that of receiver battery drain, since is cannot be assumed that users of the receivers will be diligent in switching off the receivers when no programs are being received. According to the invention the receiver circuitry is arranged to operate at very small battery drain in absence of signal, and to drain the battery only in response to signal. Receivers may be stored indefinitely, by virtue of this property, without substantial concern for battery life, the latter having life approximately equal to shelf life when in intermittent use on a low drain load.

An additional feature required of the receiver is that it not overload, and distort in the presence of strong signals. In the practice of the present invention large ranges of signal strength are encountered, depending on proximity of the receiver to a transmitting antenna. Use of AVC in simple transistor receivers proves impractical, because of cost considerations and because of the difficulty of designing appropriate circuitry. According to the present invention the receiver operates always at full sensitivity, but provision is made for preventing overload on strong signals.

It is, accordingly, a broad object of the invention to provide a novel system of short range broadcasting of multiple programs, without mutual interference.

It is another object of the invention to broadcast different programs to separate rooms or portions of the same building, all on the same frequency, and to provide personal receivers for receiving at each room or portion of a building only the program appropriate thereto.

It is a further object of the invention to provide a very light, economically constructed personal radio receiver, having zero battery drain in no signal condition.

Another object of the invention is to avoid undesirable beats and other objectionable effects from multiple carriers by utilizing the same carrier source for the activation of all transmitters. The present invention employs a quartz crystal piezo electric oscillator for frequency stability. This is a major factor in permitting close proximity of adjacent loops and minimizing undesirable effects.

It is still another object of the invention to provide a hollow wand-like receptacle having an included rod antenna, the wand being capable of carriage by the hand, so that when directed to any one of a plurality of transmitting antennae, it enables selection of transmissions from that one to the exclusion of the others. It is also an object of the invention to provide an ear piece secured to the wand receiver, whereby the ear piece may be held to the ear while the wand is being pointed.

Still a further object of the invention resides in the provision of a hygienic support, for a small acoustic transducer or ear piece, which may be discarded after use, and which provides certain acoustic advantages in respect to isolation of the ear from ambient noise, and of concentration at the ear of the acoustic output of the ear piece.

It is another object of the invention to provide a transistorized battery operated radio receiver which operates at full sensitivity at all times, but is protected against the overload effect of high intensity signals without requiring AVC circuits.

The above and still further objects, features and advantages of the present invention will become apparent upon consideration of the following detailed description of one specific embodiment thereof, especially when taken in conjunction with the accompanying drawings wherein.

Figures 1, 2, 3, 4:
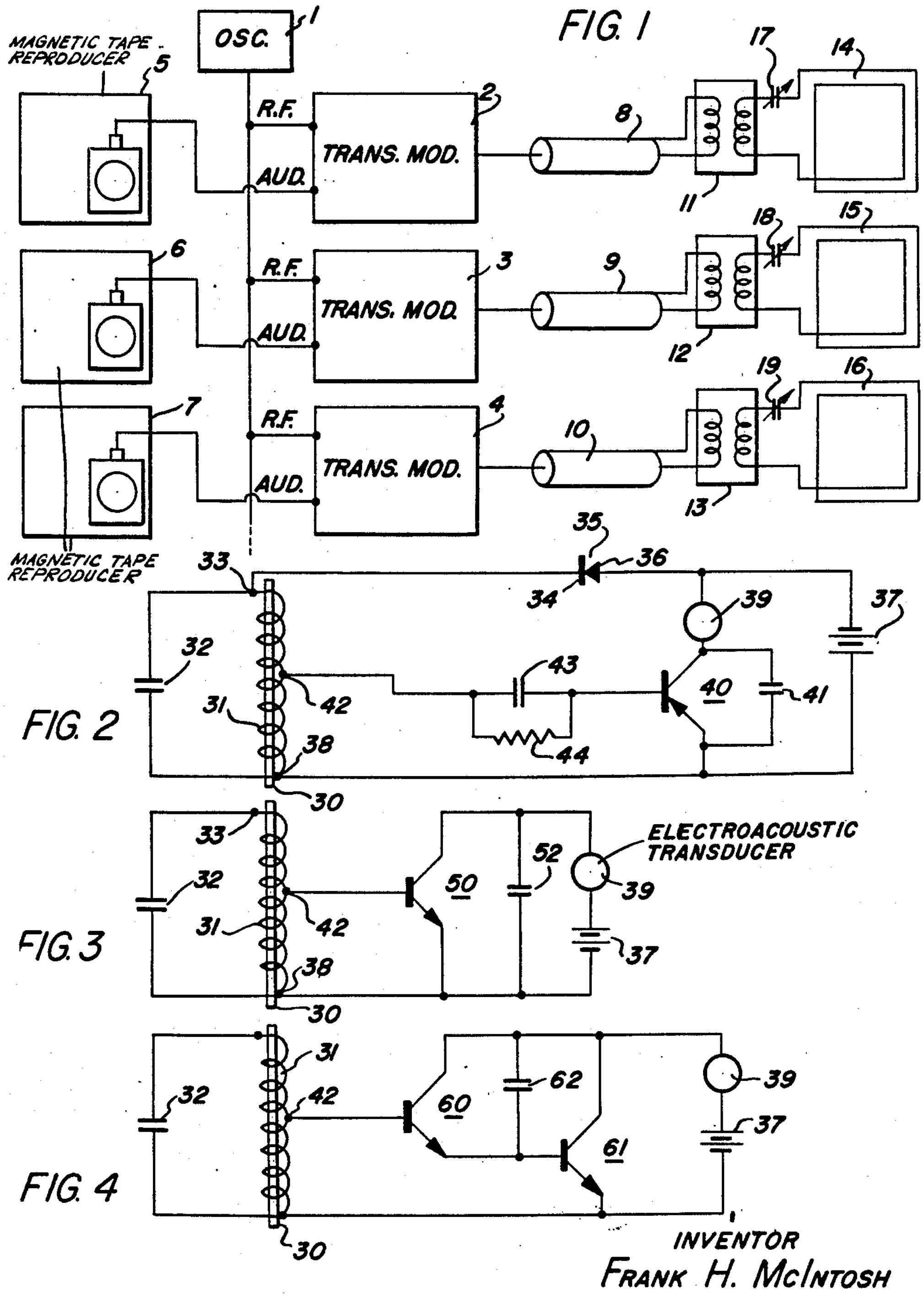
FIGURE 1 is a block diagram of a transmitter, accord-to the present invention.
FIGURE 2 is a schematic circuit diagram of a receiver according to the present invention.
FIGURES 3 and 4 are schematic circuit diagrams of modifications of the receiver of FIGURE 2.

Referring more particularly to the accompanying drawings, the reference numeral 1 denotes an oscillator, which may preferably be crystal controlled, and have a frequency of 100 kc. The specific frequency specified is exemplary only, and other values may be employed provided they are values which do not give rise to radiation fields at considerabl distances. To this end values below 100 kc. are preferred to those above.

The oscillator 1 is coupled to a plurality of three transmitter modulators 2, 3, 4 all in parallel. Clearly, any desired number of modulators may be employed, and three are illustrated for purpose of exemplification only. Modulating signals are supplied to the modulators 2, 3, 4, each from a separate magnetic tape reproducer, these being identified by the reference numerals 5, 6, 7, respectively. Each magnetic tape, in general, contains different recorded information, and the reproducers are arranged to repeat the messages indefinitely, or until reproduction is willfully terminated. The modulators 2, 3, 4, respectively, supply modulated carrier to separate transmission lines 8, 9, 10, which in turn drive impedance matching transformers 11, 12, 13. The latter drive series tuned loops 14, 15, 16, which are tuned by variable condensers 17, 18, 19 to resonance for maximum power output and to an off resonant condition when reduced output is desired.

The loops 14, 15, 16 may be all in the same plane, which may be horizontal, for some applications. For example, each separate loop may be located about the boundaries of a different room at floor level, so that different information may be broadcast into the separate rooms. On the other hand, the loops may be vertical, and need not be in the same plane, if sufficiently separated. In general, the placement of the loops is a matter of engineering judgments, the end to be accomplished being to render feasible deriving signals from the loops selectively, when the loops are in relative proximity.

By reason of the frequency employed, the character of the transmitting loop and the range at which reception takes place, the transmitted energy from any loop is in the form of a radio frequency magnetic field capable of inducing a voltage in a receiving loop whose axis is in a direction parallel to the axis of the transmitting loop.

The receiver of the system, as exemplified in FIGURE 2 of the drawings, comprises preferably a ferrite rod 30 about which is wound a coil of wire 31. The latter is tuned, by means of a parallel condenser 32, to the transmission frequency. One end 33 of the coil 31 is connected to the cathode 34 of a diode 35 (type 1N34A) the anode 36 of which is connected to the negative pole of a battery 37.

The positive pole of the battery 37 is connected to the other end 38 of the coil 31. Connected across the battery 37 is an electro-acoustic transducer 39 in the form of a small ear piece, in series with the collector to emitter path of a PNP transistor 40 (type 2N34). The latter is shunted for radio frequencies by a .01 condenser 41.

A tap 42 is taken on coil 31 about two-thirds of the distance from end 33 of coil 31, tap 42 being connected to the base of the transistor 40 via a parallel condenser 43 and resistance 44, of about .02 $\mu$f. and 47K, respectively.

In operation detection takes place in the transistor 40 input circuit by diode action between base and emitter. The transistor 40 then amplifies the detected signal and excites the transducer 39. Diode 35 functions as a radio frequency clamp to limit the voltage devloped across inductance 31, when operating in strong fields, and accordingly improves overload characteristics. Since the base and emitter of transistor 40 are maintained at the same potential when no signal is received, the transistor is cut-off resulting in nearly zero battery drain.

Since the receivers of the present invention may be on for long periods of time, whether or not signals are available, it is essential to provide a receiver which need not be turned on and off, i.e. which is at all times ready to receive, but has no current drain in the absence of signals. The exemplary embodiments of the invention illustrated in FIGURES 2 to 4 of the accompanying drawings accomplish this objective.

In accordance with a modification of the system of FIGURE 2, the tap 42 of the coil 31 is connected directly to the base of an NPN transistor 50, the emitter being connected to the end 38 of the coil 31. A battery 37 is connected in series with an electro-acoustic transducer 39, between emitter and collector of transistor 50, and an R.F. by-pass condenser 52 is connected between collector and emitter of the transistor 50.

The absence of bias between base and emitter of transistor 50, these being at the same D.C. potential, enables the transistor 50 to operate in cut-off condition in the absence of signal. In the presence of signal the transistor operates as a detector and amplifier, in that half cycles of signal of one polarity only cause flow of collector current.

In the system of FIGURE 4 the tap 42 of coil 31 is connected to the base of a first NPN transistor 60, the emitter of which is directly connected to the base of a further NPN transistor 61, the emitter of the latter being connected directly to the end point 38 of the coil 31. The collectors of the transistors 60 and 61 are directly interconnected, and battery 37 is connected in series with electro-acoustic reproducer 39 between the collectors of transistors 60 and 61 and the emitter of transistor 61. An A.F. condenser 62 is connected between the collector and base of the transistor 61.

Since the base of transistor 60 is connected through the base emitter circuit of transistor 61 to the emitter, for D.C., the transistor 60 is normally essentially cut-off, and draws no current in the absence of signal. The transistor 60 being cut-off, the base of the transistor 61 is floating, and assumes the potential of the emitter of transistor 61, so that it is also cut-off. The receiver, accordingly, draws essentially no current in the absence of signal.

In the presence of signal, the transistor 60 passes half cycles of one polarity of the received signal, causing flow of current to the base of transistor 61. The latter amplifies the signals applied to its base, effecting flow of detected current in the electro-acoustic transducer 39.

It is to be particularly noted that the receiver systems of FIGURES 3 and 4 contain a minimum number of circuit elements, i.e. no bias or load resistances and no condensers except for the optional condenser 62. The cost of fabricating the unit is minimum, and its freedom from maintenance difficulties is increased, by virtue of the simplicity of design. Moreover, it has been found that the efficiency of the system is great, i.e., it operates on minimum battery voltage (1.4 v.) with little or no drain in absence of signal and minimum drain in the presence of signal, and its noise factor is excellent.

Figures 5, 6, 7, 8:
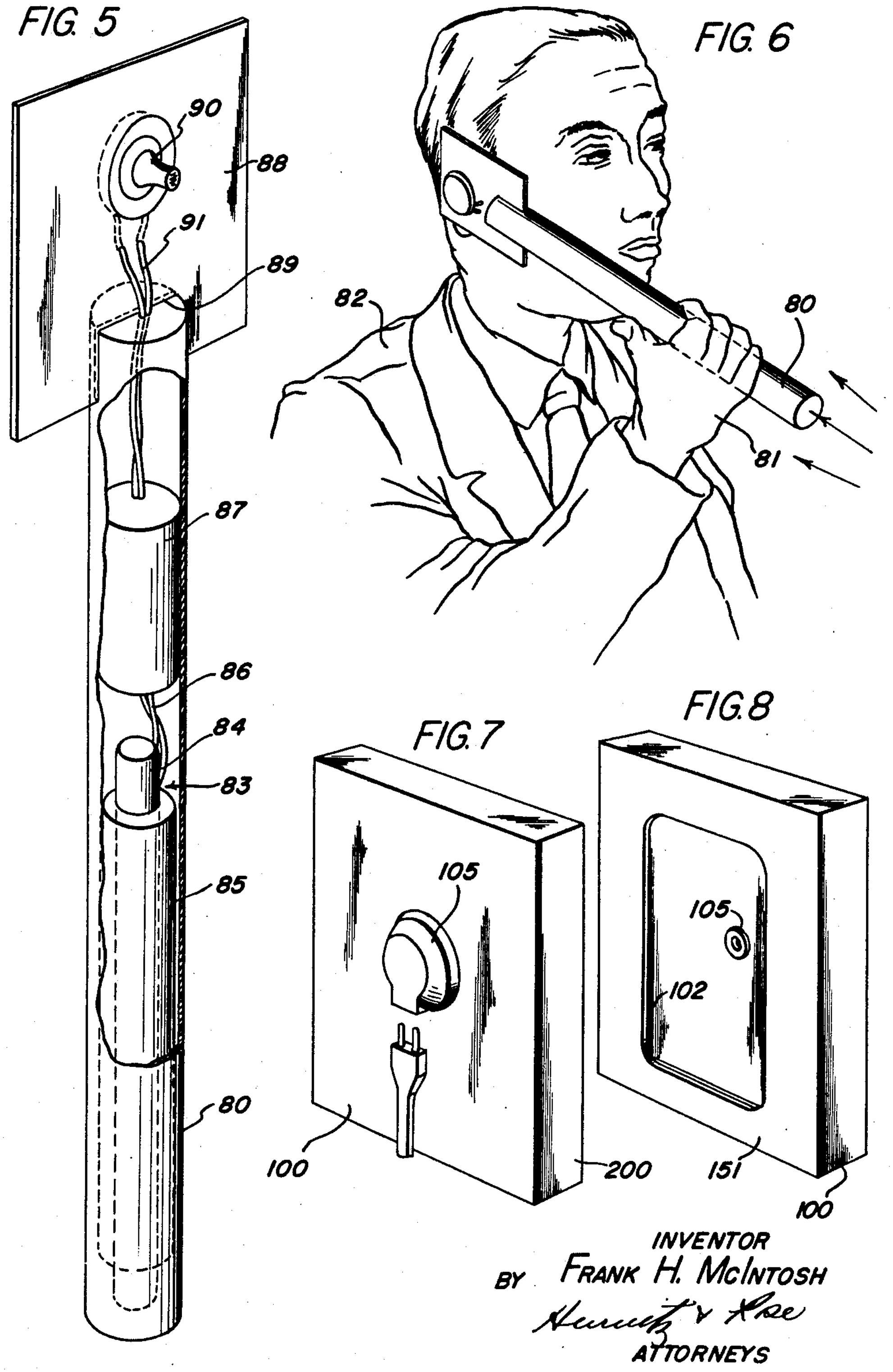
FIGURE 5 is a view in perspective of an electro-acoustic transducer and a support therefor.
FIGURE 6 is a view in perspective of a wand-like receiver, according to the invention.
FIGURE 7 is a view in perspective taken rearwardly, of an electro-acoustic transducer in the form of an ear piece, mounted in a device for securing same on the ear
FIGURE 8 is a view of the structure of FIGURE 7, taken in reverse position.

In FIGURES 5 and 6 of the accompanying drawings is illustrated a wand-like structure 80, comprising a hollow container, about 10″ long and of cross-section suited in extent and shape to be grasped by the hand 81 of a person 82 desiring to receive selectively one of the broadcasts transmitted by the system of FIGURE 1.

Internally of the wand-like container 80 is a receiving antenna 83, comprising a ferrite rod 84 with a coil 85 wound thereon and a tuning condenser connected thereacross, the coil terminals leading to a receiver 87, such as that of FIGURE 3 or FIGURE 4. Secured to one end of the wand-like structure 80 is a thin wafer 88 made of heavy cardboard, plastic material or the like, and perhaps 1/16" thick. The wafer 88 is partially inserted in an endwise slot 89 in the wand-like container 80 and is locked in said slot, in any convenient fashion, so as to be immovable.

Secured to the wafer 88 is a small acoustic transducer 90 of the type commonly employed in hearing aids. Preferably, the transducer 90 may be secured in a suitably shaped aperture 91 in the wafer 90 and locked therein in any convenient fashion. The transducer 90 is connected to the output of receiver 87 via leads 91.

In operation, the wand-like container 80 may be pointed at any one of the transmitting antennae of FIGURE 1, in order selectively to receive signals from that antenna to the exclusion of the others. The wand-like structure 80 may be pointed while the transducer 90 is held to the ear, so that by turning the body orientation of the wand may be modified without removing the transducer from the ear.

In practical utilization of the present system, each of the antennae 14, 15, 16 may be secreted behind an exhibit in an industrial convention containing many such exhibits, with the axis of each antenna pointing toward persons standing before an exhibit. Such persons may then pass from exhibit to exhibit, at each exhibit may point the wand-like container 80 at the exhibit while facing the exhibit, and while holding the transducer to his ear. Thereby, he may hear the broadcast provided by that exhibitor, alone, before whose exhibit he is standing.

Persons may be subjected to informative broadcasting concerning any given exhibit, in this manner, without disturbing others, and the total manpower required to maintain service at the exhibits may be thus sharply reduced, with considerable saving to the exhibitors.

Since the receivers are non-radiating, as many persons as so desire may listen to any one broadcast, without disturbing others who are likewise listening, and since no wired connections are required between the exhibits and the listeners the latter may assume a variety of positions with respect to the exhibit without losing the broadcast. This is valuable where exhibits are of considerable physical extent, and contain many items. There is, moreover, no objection to having two or more antennae and associated transmitters for a single large exhibit, each being directed to different items or aspects of the exhibit.

In FIGURES 7 and 8 is illustrated a box-like structure 100, fabricated preferably of selectively flexible paper or cardboard so that it may be discarded after one use. The structure 100 includes in one wall 101 a substantially rectangular opening 102, the size of which is adequate to permit slipping over the ear of the normal person, whereupon the lips of the opening 102 extend behind the ear and serve to mount securely the box-like structure to the ear.

Extending through a small aperture in that wall 103 of box-like structure 100, which lies opposite to wall 101, is a small hearing-aid type transducer 105.

In operation the structure 100 is supplied to a person desiring to utilize the present system. The later inserts the transducer 105, and mounts the structure on his ear. The structure 100 is disposable after one use, which is important aesthetically to many users, i.e., it is a hygienic measure. The ear piece 105 is not disposable, but in the practice of the invention need not touch the skin of the user. The structure 100 then operates to isolate the ear substantially from outside disturbances, and at the same time to enhance the sounds provided by the ear piece 105. In net consequence, the sounds emanating from the ear piece 105 are as clear and loud as they would be if the ear piece were actually inserted in the ear.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. A broadcast system, comprising a single oscillator, a plurality of modulators, means coupling said single oscillator to said plurality of modulators in relation to be modulated by modulating signals applied to said modulators, means for applying a different modulating signal to each of said modulators, a separate loop connected to each of said modulators, separate adjustable tuning means for tuning each loop to the frequency of said oscillator, said oscillator having a relatively low frequency such that energy is emitted from said loops primarily to areas within the confines of said loops and immediately adjacent thereto, whereby said loops may be placed adjacent one another and the induction patterns of said loops subsist in substantially non-overlapping relation, such loops being all closely adjacent one another.

2. The combination according to claim 1 wherein said means for tuning is a variable series condenser, whereby the total power emitted from any loop may be adjusted by varying the capacity of the condenser associated therewith.

3. The combination according to claim 1 wherein each source of modulating signal is a magnetic tape reproducer operating continuously to provide a signal of predetermined information content repetitively.

4. The combination according to claim 1 wherein is further provided a portable receiver, said receiver including a rod antenna tuned to the frequency of said oscillator and manipulatable manually into an orientation parallel with the direction of polarization of energy emitted by any selected one of said loops.

5. The combination according to claim 1 wherein is further provided an elongated wand-like container, said container including a rod antenna, means for tuning said antenna to the frequency of said oscillator, a detector coupled to said antenna, an electro-acoustic transducer secured to said container externally thereof and coupled to said detector, whereby said container may be pointed generally parallel to the axis of any one of said loops to the exclusion of the axis of others of said loops while said transducer is held to the ear.

6. A system of broadcasting and reception, comprising a plurality of transmitters, each transmitting on the same relatively low carrier frequency and in relatively fixed phase, a common oscillator for supplying said low carrier frequency to all said transmitters, means for differently audio modulating the transmissions from each of the plurality of transmitters, said transmitters each having a separate tuned loop, the loops being separated in space, but closely adjacent, and a portable receiver for selectively receiving the transmissions from said plurality of transmitters, said receiver having a ferrite core antenna of rod-like configuration and an ungrounded coil tuned to said carrier frequency linking with said core whereby said receiver receives a transmission at maximum intensity from that one of said loops having an axis aligned with the axis of said ferrite core, the spatial configuration of said loops and of said ferrite core antenna being such that communication between said loops and said antennae occur inductively and selectively according to the orientation of said ferrite core.

7. The combination according to claim 6 wherein said receiver includes a transistorized detector circuit coupled to said coil and including a transistor biased for substantially zero current flow in response to negligible signal strength at said carrier frequency.

References Cited in the file of this patent

UNITED STATES PATENTS

| | | |
|---|---|---|
| 1,797,696 | Ruddy | Mar. 24, 1931 |
| 1,797,746 | Young | Mar. 24, 1931 |
| 2,159,647 | Alford | May 23, 1939 |
| 2,413,396 | Weagant | Dec. 31, 1946 |

| | | |
|---|---|---|
| 2,419,833 | Grimes | Apr. 29, 1947 |
| 2,567,431 | Halstead | Sept. 11, 1951 |
| 2,802,938 | Herzog | Aug. 13, 1957 |
| 2,889,453 | Stern | June 2, 1959 |
| 2,899,547 | Crow et al. | Aug. 11, 1959 |

OTHER REFERENCES

"Radio Physics Course," Ghirardi, Radio and Technical Pub. Co., 2nd ed., 1937, pages 337–343.